Dec. 25, 1962 — R. W. GIER ET AL — 3,070,084
OUTDOOR GRILL
Filed Aug. 18, 1961
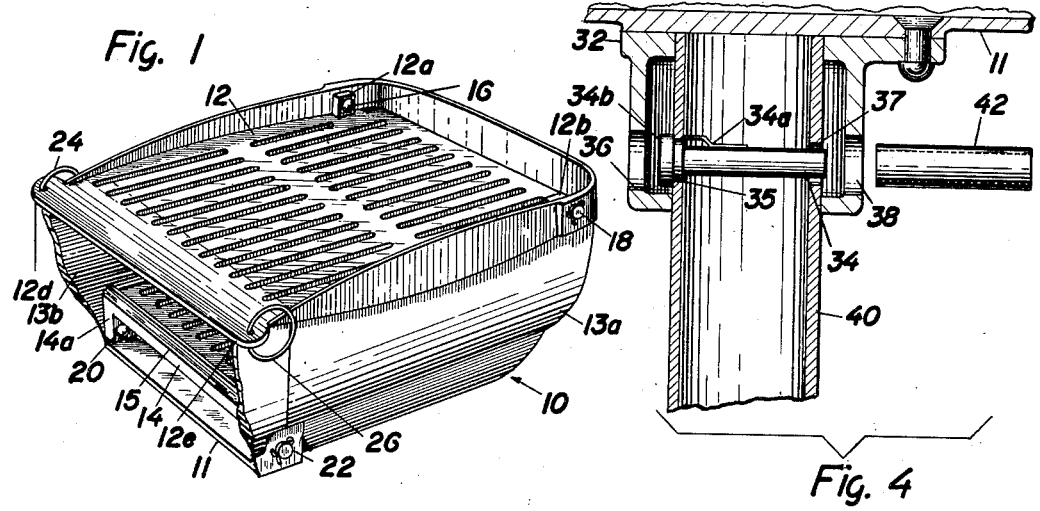
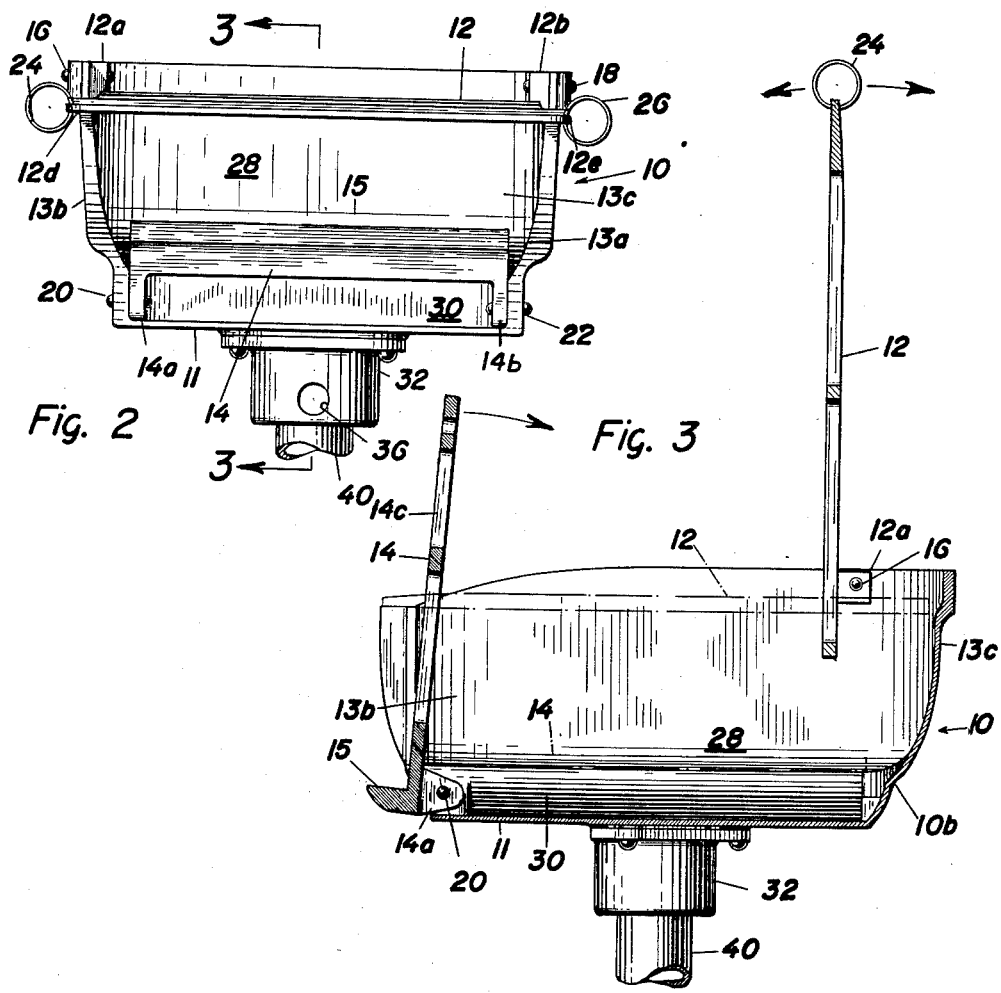

United States Patent Office 3,070,084
Patented Dec. 25, 1962

3,070,084
OUTDOOR GRILL
Richard W. Gier and Harrison Weaver, Jr., Brillion, Wis., assignors to Brillion Iron Works, Inc., Brillion, Wis., a company of Wisconsin
Filed Aug. 18, 1961, Ser. No. 132,340
6 Claims. (Cl. 126—25)

The prior art has suggested a great variety of outdoor cooking devices and most of such devices can be classified under two general headings.

First, there is the more or less permanent cooking unit of the brick or masonry type which is frequently seen in public picnic and recreational areas as well as in back yards. This type of cooking unit has the advantage that it will last for many, many years and can be left in a location with little danger that it will be stolen—but it suffers from the disadvantage that it requires considerable time, skill, effort and money to construct.

Secondly, there is the metallic and portable "cook-out" unit which currently is so widely used in back yards and patios. This type of cooking unit has the advantages of low cost, light weight and easy portability but it does not last as long as the masonry type of cooking unit, is not very rugged and can easily be stolen.

A few cooking units have been suggested by prior art workers which are more or less a combination of the aforementioned first and second types and which comprise a cast iron grill arrangement mounted on a pedestal. However, one of the primary disadvantages of such combination units is that they are difficult to clean.

It is therefore a primary object of this invention to provide a novel type of outdoor cooking unit which is rugged, long lasting, inexpensive, which can be installed easily and quickly and which is essentially pilfer-proof. A further object is to provide such a unit which can be easily charged with fuel, quickly cleaned and which requires very little maintenance.

Another object of the invention is to provide an outdoor cooking grill which may be pivotably mounted upon a pedestal, whereby the cooking grill may be turned in various directions in accordance with the desired amount of wind which will be required to maintain the fire at its proper level.

Another object of the invention is to provide an outdoor fireplace having pivotable grate members arranged so that they can be moved to a vertical position whereby material deposited thereon may easily be removed to a location outside the interior of the firebox.

Still another object of this invention is to provide ready accessibility to the fuel area during the cooking operation so as to permit redistribution of the fuel within the firebox.

A still further object of this invention is to provide a durable, easily installed and conveniently operated and maintained outdoor grill requiring a minimum number of parts.

Still other objects and advantages of this invention will become apparent after studying the attached drawings in conjunction with the following description.

In the drawings:

FIGURE 1 is a perspective view of my cooking grill with the grates shown in the cooking position, the front edges of the two side walls being cut away so as to permit clearer viewing of the interior of the grill;

FIGURE 2 is an elevation view looking into the firebox of my cooking grill;

FIGURE 3 is a cross section view along 3—3 of FIGURE 2 showing the grates in their "open upward" position and so as to permit access to the firebox and ash receiving section;

FIGURE 4 is an enlarged cutaway cross sectional view of the collar and pipe means for mounting the grill on a pipe.

The invention in its broader aspects involves an outdoor cooking unit comprising:

(a) A unitary firebox formed by a bottom plate and two side walls rising upwardly from opposite sides of said bottom plate, (b) Two grate members mounted one above the other within the confines of said firebox, (c) Said grate members each being vertically pivotable about separate horizontal axes, (d) One of said grate members being pivotable in a clockwise direction and the other of said grate members being pivotable in a counter-clockwise direction, (e) Said firebox having at least one side open so as to provide ready access to the lower of said two grates, and (f) Means to support said firebox the desired distance above the ground.

Referring now to FIGURES 1–3, the firebox 10 is seen to comprise bottom plate 11, side walls 13a and 13b and back wall 13c. Two grate members 12 and 14 are shown as being mounted on above the other within the confines of said firebox. The upper grate or "cooking grate" 12 is mounted for movement to a vertical position above two bolt-like members 16 and 18 located in side walls 13b and 13a respectively by virtue of the two flange extensions 12a and 12b on the back side of the grate 12. The opposite end of cooking grate 12 (i.e. its front edge) has two laterally diverging ears 12d and 12e which are designed to rest upon the top edge of sides 13b and 13a respectively and thereby limit the downward movement of grate 12. Ears 12d and 12e also are preferably provided with rings 24 and 26 which aid in lifting the grade through a vertical arc from the position shown in FIGURE 1 to the position shown in FIGURE 3.

The lower grate or "fuel grate" 14 is shown as being a little smaller than the cooking grate 12 and mounted directly therebeneath. Fuel grate 14 is provided with two downwardly depending flanges 14a and 14b which contain holes to receive bolt-like members 20 and 22, said bolts being mounted in the lower forward portions of side walls 13b and 13a. Fuel grate 14 can thereby pivot from the position shown in FIGURES 1 and 2 to the position shown in FIGURE 3. By appropriately shaping flanges 14a and 14b the maximum pivoted position of grate 14 can be controlled. In FIGURE 3 the flange 14a is shown as being shaped so that the grate 14 cannot be pivoted further in a counter-clockwise position than shown. However, while the cooking grate 12 is shown as being pivoted (clockwise) from the horizontal position shown in FIGURE 1 to the vertical position of FIGURE 3, this grate is preferably designed so that it will pivot even further in a clockwise direction, and most desirably until it is again in nearly a horizontal plane. In this position the underside of grate 12 can thus serve as a table prior to or after the cooking operation.

Below the fuel grate 14 there is provided an ash chamber 30 which is adapted to receive the ashes from the fuel as the fuel is gradually consumed. When the fuel grate 14 is raised to the position shown in FIGURE 3 one may have easy access to the ash chamber 30 in order to quickly and efficiently remove accumulated ashes. The ash chamber 30 should not be permitted to become too full since this condition may cut down or completely block off the air draft which ordinarily comes up through the fuel grate 14.

The number, size and arrangement of slots or openings in grates 12 and 14 are not critical and may be varied by manufacturers depending upon whether the cooking unit is designed for one specific purpose or general use.

It will be seen that by raising grate 12 one can have access to the fuel on grate 14 and may either add fuel or rearrange it to achieve either uniform or localized heating. Also, by tilting or pivoting the grates to the positions shown in FIGURE 3 at the end of a cooking operation it is possible for one to dump any unconsumed or partially consumed fuel remaining on grate 14 into a waiting receptacle. The forward edge of grate 14 is preferably provided with a lip 15 which serves to keep the fuel from accidentally rolling out during the cooking operation or during rotation of the firebox.

The previously described firebox 10 may be mounted upon any suitable base. A preferred type of base involves the use of a pipe support. FIGURES 2 and 3 show a support pipe 40 having an upper end which is adapted to fit within a collar 32. The collar 32 is preferably fastened to the underside of bottom plate 11 by means of one or more rivets. The entire firebox 10 is rotatably mounted on support pipe 40 to permit cooking to the windward in order to assure a satisfactory draft to the fuel and also to keep smoke away from the chef. The lower part of support pipe 40 can either be mounted in a heavy flat base plate or set in concrete.

FIGURE 4 is an enlarged cross sectional view of the manner in which the support pipe 40 and collar 32 cooperate. It will be seen that the upper end of pipe 40 actually serves as a bearing enabling the firebox 10 to be rotated in any direction. Collar 32 also has a pair of aligned apertures 36 and 38 which are in turn aligned with apertures 35 and 37 in pipe 40. A bolt 34 having a radially extending retainer spring 34a may be inserted through aperture 36 or 38 to be fitted within the apertures 35 and 37 in pipe 40. When the bolt 34 is inserted into the pipe 40 the spring 34a will ride against the opening in the pipe and be compressed into a groove longitudinally along the bolt. As the spring 34a is inserted past the inner circumference of the pipe it will spring back to its "extended" position thereby retaining the bolt 34 in this position. The collar 32 is thus effectively prevented from moving upward past the bolt head 34b and since the collar 32 is attached to the firebox 10 by means of rivets, welding or other permanent retaining means the firebox 10 is securely mounted upon the pipe 40. The firebox 10 can be removed from the pipe 40 by using a tube of key 42 (shown in dotted outline). The thin tube type of key 42 may be inserted through apertures 38 and 37 and then around the bolt until it depresses the expanded retaining spring 34a. When the spring 34a is depressed by key 42, the bolt 34 may be withdrawn from apertures 37, 35 and 36 and the firebox lifted from the pipe 40. It is thus seen that the cooking unit is pretty well protected from unauthorized removal. This is particularly desirable in public recreation areas.

In conclusion, while the foregoing specification and drawing describe the construction, operation and use of one preferred embodiment of the instant invention, it is to be understood that we do not intend to limit ourselves to the precise constructions and arrangements herein disclosed, since the various details of construction, form and arrangement may obviously be varied to a considerable extent by anyone skilled in the art without really departing form the basic principles and novel teachings of this invention and without sacrificing any of the advantages of the invention, and accordingly it is intended to encompass all changes, variations, modifications and equivalents falling within the scope of the appended claims.

What is claimed is:
1. An outdoor cooking unit comprising:
   (a) a unitary firebox formed by a bottom plate and two side walls rising upwardly from opposite sides of said bottom plate,
   (b) two grate members mounted one above the other within the confines of said firebox,
   (c) said grate members each being pivotable to vertical positions about separate horizontal pivot means located on the firebox,
   (d) one of said grate members being pivotable through a substantial vertical arc in a clockwise direction when viewed from one side of said firebox and the other of said grate members being pivotable through a susbtantial vertical arc in a counterclockwise direction when viewed from the same side of said firebox,
   (e) said firebox having at least one side open so as to provide ready access to the lower of said two grates, and
   (f) means to support said firebox the desired distance above the ground.

2. An outdoor cooking unit according to claim 1 wherein said firebox has three side walls.

3. An outdoor cooking unit according to claim 1 wherein the lower of said grate members pivots about an axis which is closer to said one open side than the axis about which the upper of said grate members pivots.

4. An outdoor cooking unit according to claim 2 wherein the upper of said grates is adapted to pivot from one horizontal position to another.

5. An outdoor cooking unit according to claim 2 wherein said means to support said firebox the desired distance above the ground includes a collar attached to the bottom of the firebox which permits the firebox to be rotatably supported upon the top of a pipe.

6. An outdoor cooking unit according to claim 5 wherein said collar and pipe are provided with aligned apertures through which is inserted a bolt having a spring extension which locks said bolt within the apertures of said pipe.

References Cited in the file of this patent

UNITED STATES PATENTS

| | | |
|---|---|---|
| 416,068 | Muller | Nov. 26, 1889 |
| 1,999,515 | Muenzer | Apr. 30, 1935 |
| 2,482,068 | Larson | Sept. 13, 1949 |
| 2,550,057 | Garfunkle | Apr. 24, 1951 |
| 2,816,538 | Miller | Dec. 17, 1957 |